(12) United States Patent
Ito et al.

(10) Patent No.: US 8,620,503 B2
(45) Date of Patent: Dec. 31, 2013

(54) HYBRID VEHICLE

(75) Inventors: Takahiro Ito, Toyota (JP); Ryuichi Kamaga, Nisshin (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 173 days.

(21) Appl. No.: 13/140,137

(22) PCT Filed: Dec. 22, 2008

(86) PCT No.: PCT/JP2008/073300
§ 371 (c)(1),
(2), (4) Date: Aug. 3, 2011

(87) PCT Pub. No.: WO2010/073309
PCT Pub. Date: Jul. 1, 2010

(65) Prior Publication Data
US 2011/0288710 A1 Nov. 24, 2011

(51) Int. Cl.
G06F 17/00 (2006.01)
(52) U.S. Cl.
USPC .......................................................... 701/22
(58) Field of Classification Search
USPC .................................. 701/22, 36; 180/65.21
See application file for complete search history.

(56) References Cited

U.S. PATENT DOCUMENTS

2007/0029986 A1* 2/2007 Nakamura et al. ............ 323/318

FOREIGN PATENT DOCUMENTS

| JP | U-63-95125 | 6/1988 |
|---|---|---|
| JP | A-5-28872 | 2/1993 |
| JP | A-7-302150 | 11/1995 |
| JP | A-9-46821 | 2/1997 |
| JP | A-11-237427 | 8/1999 |
| JP | A-2001-222923 | 8/2001 |
| JP | A-2001-227438 | 8/2001 |
| JP | A-2007-62639 | 3/2007 |
| JP | A-2007-69625 | 3/2007 |
| JP | A-2008-128192 | 6/2008 |
| JP | A-2009-18713 | 1/2009 |

OTHER PUBLICATIONS

International Search Report issued in International Application No. PCT/JP2008/073300 on Apr. 14, 2009 (with translation).

* cited by examiner

Primary Examiner — Kim T Nguyen
(74) Attorney, Agent, or Firm — Oliff & Berridge, PLC

(57) ABSTRACT

A switch sets the voltage level of a control line to a first level corresponding to a first voltage by electrically coupling the control line with a first node when manual operation is not executed. The switch sets the voltage level of the control line at a second level corresponding to a second voltage by electrically coupling the control line with a second node during a period of time over which manual operation is executed. An ECU switches the operation mode of a hybrid vehicle having first and second power sources between a first mode in which the first power source is used having higher priority for the running of the hybrid vehicle, and a second mode in which said second power source is used having higher priority for the running of the hybrid vehicle, based on a change of the voltage level of the control line.

11 Claims, 12 Drawing Sheets

HYBRID VEHICLE

TECHNICAL FIELD

The present invention relates to hybrid vehicles, particularly a hybrid vehicle having a plurality of running modes.

BACKGROUND ART

In recent years, great attention is directed to hybrid vehicles from the standpoint of environmental problems. A hybrid vehicle has a plurality of power sources incorporated. A hybrid vehicle incorporating, as the driving source, a power storage device (battery, capacitor and the like) and a motor, in addition to a conventional engine, is already put into practical use.

A fuel cell car incorporating a fuel cell for the power source is also attracting attention. In a broad sense, a vehicle incorporating a power storage device such as a battery and capacitor, in addition to a fuel cell, as the power supply, can be taken as a hybrid vehicle incorporating a plurality of power sources.

There is also known a hybrid vehicle with an external charging capability for charging a power storage device by means of an external power supply. Such a hybrid vehicle with an external charging capability is advantageous in that the frequency in stopping over at a resupply stand for the supply of fuel will be reduced if the power storage device can be charged from, for example, a commercial household power supply.

Japanese Patent Laying-Open No 2007-62639 (Patent Literature 1) discloses a hybrid vehicle that can force a power source reduced in operation frequency to operate. This hybrid vehicle includes, as the power source, an engine, as well as a power storage device and a motor generator. When the HV mode transition switch is turned on during the run of an EV mode in which the vehicle runs with only the power storage device and motor generator as the power source, the control device shifts the running mode to the HV mode in which the vehicle runs with also the engine driven.

Patent Literature 1: Japanese Patent Laying-Open No. 2007-62639

DISCLOSURE OF THE INVENTION

Problems to be Solved by the Invention

According to the configuration disclosed in Japanese Patent Laying-Open No. 2007-62639 (Patent Literature 1), the control device determines whether the driver has operated the switch for changing the running mode according to a signal output from the switch. Specifically, the control device determines that the switch has been operated when the voltage of the signal is at an H (logical high) level. However, when there is an error in the control line through which the signal from the switch is transmitted, there is a possibility that the control device cannot properly switch the running mode. For example, the control device may erroneously switch the running mode.

An object of the present invention is to provide a hybrid vehicle capable of avoiding, in the case where an error occurs at a control line through which a signal indicating switching of the running mode is transmitted, continuously running in a running mode differing from the proper running mode.

Means for Solving the Problems

The present invention is directed to a hybrid vehicle including first and second power sources, each configured to allow driving of the hybrid vehicle, a control line, a first node having a first voltage, a second node having a second voltage, a switch, and a control device. The switch sets the voltage level of the control line at a first level corresponding to the first voltage by electrically coupling the control line with the first node when manual operation is not executed. The switch sets the voltage level of the control line at a second level corresponding to the second voltage by electrically coupling the control line with the second node during a period of time over which manual operation is executed. The control device switches the running mode of the hybrid vehicle between a first mode in which the first power source is used having higher priority for the running of the hybrid vehicle and a second mode in which the second power source is used having higher priority for the running of the hybrid vehicle, based on a change from the first level to the second level that is a first change in the voltage level of the control line, and the change from the second level to the first level that is a second change in the voltage level of the control line.

Preferably, the first power source includes a rotating electric machine configured to allow driving a drive wheel, and a power storage device configured to be able to store electric power and supply the stored electric power to the rotating electric machine. The second power source includes an internal combustion engine.

Preferably, the first mode is directed to driving the rotating electric machine by using the electric power stored in the power storage device. The second mode is directed to causing the hybrid vehicle to run by driving the internal combustion engine.

Preferably, the control device switches the running mode between the first mode and the second mode when both the first change and second change are detected.

Preferably, the control device switches the running mode between the first mode and the second mode according to the first change. In the case where the second change does not occur before an elapse of a predetermined period of time from a base point in time when the first change has occurred, the control device returns the running mode to the mode set prior to the base point in time. In the case where the second change occurs before the elapse of the predetermined period of time from the base point in time, the control device holds the running mode at the mode attained after the base point in time.

Preferably, when the second change occurs before the elapse of the predetermined period of time from the base point in time when the first change has occurred, the control device switches the running mode between the first mode and second mode. When the second change has not occurred before the elapse of the predetermined period of time from the base point in time, the control device holds the running mode at the mode set prior to the base point in time.

Preferably, the hybrid vehicle further includes a charger configured to be able to charge the power storage device using electric power applied from a source external to the hybrid vehicle.

Preferably, the control device sets the running mode at the first mode when running of the hybrid vehicle is started for the first time after charging of the power storage device by the charger ends.

Effects of the Invention

In the case where an error occurred at a control line through which a signal for indicating switching of a running mode is transmitted, the event of the hybrid vehicle continuously run-

Figure 1:
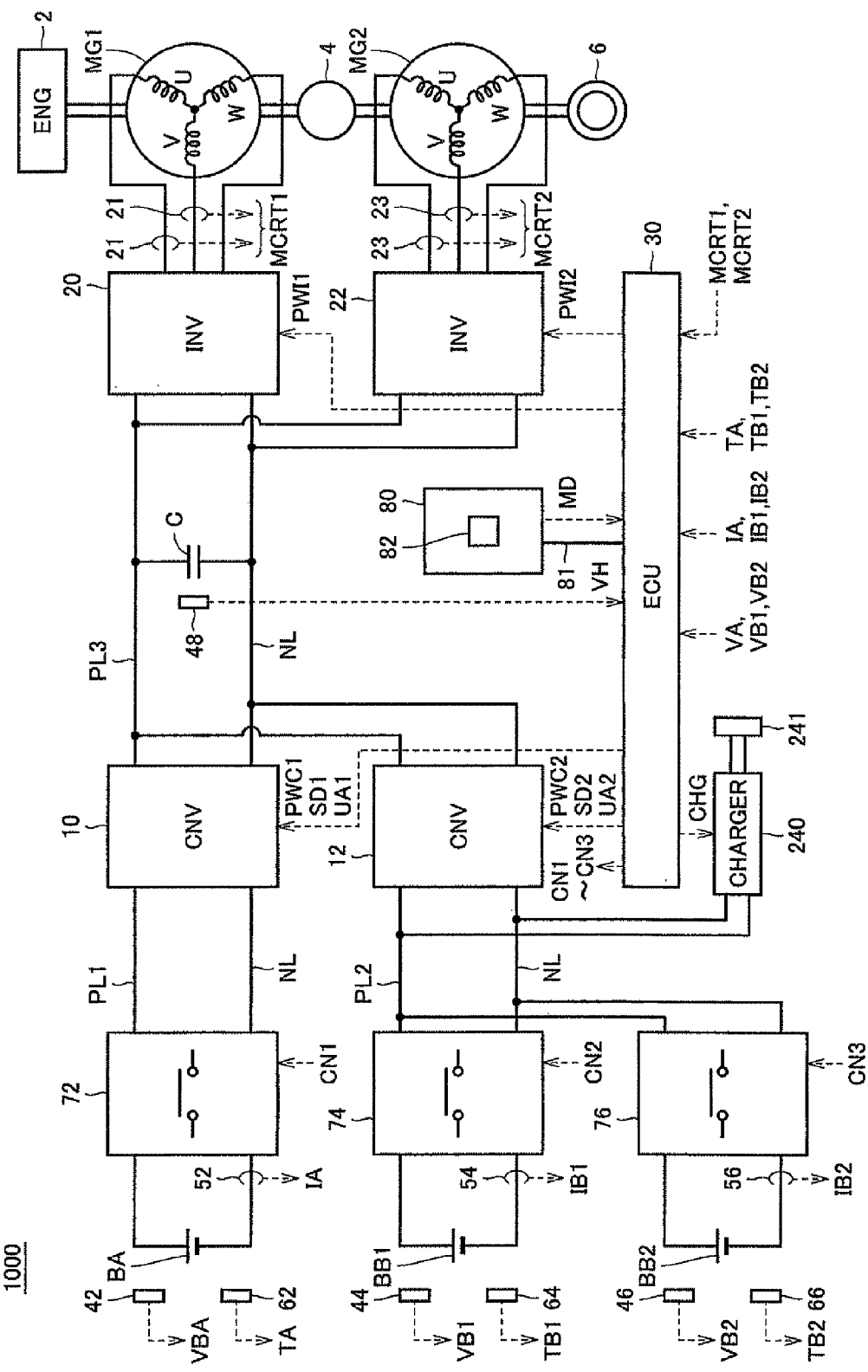
FIG. 1 represents an entire block diagram of a hybrid vehicle according to a first embodiment.

DESCRIPTION OF THE REFERENCE SIGNS 2 engine; 4 power split mechanism; 6 wheel; 10, 12 converter; 15 U-phase arm; 16 V-phase arm; 17 W-phase arm; 20, 22 inverter; 21, 23, 52, 54, 56, 184 current sensor; 30 ECU; 42, 44, 46, 48, 182, 188 voltage sensor; 62, 64, 66 temperature sensor; 72, 74, 76 connection unit; 80, 80A signal generation circuit; 81 control line; 82, 312 switch; 83 resistor; 84 ground node; 85 power supply node; 240 charger; 241 inlet; 242 AC/DC conversion circuit; 244 DC/AC conversion circuit; 246 insulation transformer; 248 rectifying circuit; 250 run control unit; 260 total power calculation unit; 270, 280 inverter control unit; 290 mode switching control unit; 295 engine control unit; 300 charge cable; 310 connector; 320 plug; 330 CCID; 332 relay; 334 control pilot circuit; 400 receptacle; 402 power supply; 1000 hybrid vehicle; BA main power storage device; BB1, BB2 sub power storage device; C, C1, C2 capacitor; D1-D10 diode; L1, L2 reactor; MG1, MG2 motor generator; NL negative line; PL1, PL2, PL3 positive line; Q1-Q10 switching element; RA, RB1, RB2 limiting resistor; SRB1, SRP1, SRG1, SRB2, SRP2, SRG2, SRB3, SRP3, SRG3 system main relay; UL, VL, WL line.

BEST MODES FOR CARRYING OUT THE INVENTION

Embodiments of the present invention will be described in detail hereinafter with reference to the drawings. In the drawings, the same or corresponding elements have the same reference characters allotted, and the description thereof will not be repeated.

First Embodiment

FIG. 1 is an entire block diagram of a hybrid vehicle according to a first embodiment.

Referring to FIG. 1, hybrid vehicle 1000 includes a main power storage device BA, sub power storage devices BB1, BB2, connection units 72, 74, 76, converters 10, 12, a capacitor C, inverters 20, 22, positive lines PL1, PL2, PL3, a negative line NL, an engine 2, motor generators MG1, MG2, a power split mechanism 4, and a wheel 6. Hybrid vehicle 1000 also includes voltage sensors 42, 44, 46, 48, current sensors 21, 23, 52, 54, 56, temperature sensors 62, 64, 66, a charger 240, an inlet 241, and an ECU (Electronic Control Unit) 30.

Hybrid vehicle 1000 includes first and second power sources. The first power source includes main power storage device BA, sub power storage devices BB1, BB2, and motor generator MG2. The second power source includes engine 2. Hybrid vehicle 1000 can run employing at least one of the first and second power sources.

Engine 2 is an internal combustion engine, generating the motive power by burning fuel such as gasoline.

Power split mechanism 4 is coupled to engine 2 and motor generators MG1, MG2 to split the power therebetween. Power split mechanism 4 is formed of a planetary gear train having three rotational shafts of the sungear, carrier, and ring gear, for example. These three rotational shafts are connected to the rotational shafts of engine 2, motor generator MG1, and motor generator MG2, respectively. By setting a hollow rotor for motor generator MG1 and passing the crankshaft of engine 2 at the center thereof, engine 2 and motor generators MG1, MG2 can be mechanically connected to power split mechanism 4. The rotational shaft of motor generator MG2 is coupled to wheel 6 by a reduction gear or differential gear not shown.

Motor generator MG1 is mounted on hybrid vehicle 1000, operating as a power generator driven by engine 2, and as an electric motor that can start engine 2. Motor generator MG2 is mounted on hybrid vehicle 1000 as an electric motor mainly driving wheel 6.

Each of main power storage device BA and sub power storage devices BB1, BB2 are power storage devices capable of being charged and discharged, and is formed of a secondary battery such as of nickel-metal hydride or lithium ions. A capacitor of large capacitance may be employed for at least one of main power storage device BA and sub power storage devices BB1, BB2.

Main power storage device BA supplies electric power to converter 10, and is charged by converter 10 in an electric power regeneration mode. Each of sub power storage devices BB1, BB2 supplies electric power to converter 12, and is charged by converter 12 in an electric power regeneration mode.

Sub power storage devices BB1 and BB2 are selectively connected to converter 12 by connection units 74 and 76. Accordingly, it is no longer necessary to provide a converter corresponding to each sub power storage device. In the present embodiment, there are, but not limited to, two sub power storage devices. In the following, the sub power storage device connected to converter 12, among sub power storage devices BB1 and BB2, is referred to as "sub power storage device BB".

Connection unit 72 is provided between main power storage device BA and positive and negative lines PL1, NL. Connection unit 72 has the conducting state (ON)/non-conducting state (OFF) controlled according to a signal CN1 applied from ECU 30. When connection unit 72 attains an on state, main power storage device BA is connected to positive line PL1 and negative line NL. In contrast, when connection unit 72 attains an off state, main power storage device BA is cut off from positive line PL1 and negative line NL.

Connection unit 74 is connected between a sub power storage device BB1, and positive and negative lines PL2, NL. Connection unit 74 attains a conducting state or non-conducting state according to a signal CN2. Accordingly, connection unit 74 electrically connects/disconnects sub power storage device BB1 with/from positive line PL2 and negative line NL.

Connection unit 76 is provided between a sub power storage device BB2 and positive and negative lines PL2, NL. Connection unit 76 attains a conducting state or non-conducting state according to a signal CN3. Accordingly, connection unit 76 electrically connects/disconnects sub power storage device BB2 with/from positive line PL2 and negative line NL.

Converter 10 is connected to positive line PL1 and negative line NL. Converter 10 boosts the voltage from main power storage device BA based on a signal PWC1 from ECU 30, and provides the boosted voltage onto positive line PL3. Converter 10 down-converts the regeneration power supplied from inverters 20 and 22 via positive line PL3 to the voltage level of main power storage device BA based on signal PWC1 to charge main power storage device BA.

Converter 10 stops the switching operation upon receiving a shutdown signal SD1 from ECU 30. Converter 10 fixes the upper arm and lower arm (described afterwards) in converter 10 to an ON state and OFF state, respectively, upon receiving an upper arm ON signal UA1 from ECU 30.

Converter 12 is connected to positive line PL2 and negative line NL. Converter 12 boosts the voltage of sub power storage device BB based on a signal PWC2 from ECU 30, and provides the boosted voltage onto positive line PL3. Converter 12 down-converts the regeneration power supplied from inverters 20 and 22 via positive line PL3 to the voltage level of sub power storage device BB based on signal PWC2 to charge sub power storage device BB.

Furthermore, converter 12 stops the switching operation upon receiving a shutdown signal SD2 from ECU 30. Converter 12 fixes the upper arm and lower arm (described afterwards) in converter 12 to an ON state and OFF state, respectively, upon receiving an upper arm ON signal UA2 from ECU 30.

Capacitor C is connected between positive line PL3 and negative line NL to smooth the voltage variation between positive line PL3 and negative line NL.

Inverter 20 responds to signal PWI1 from ECU 30 to convert the DC voltage from positive line PL3 into 3-phase AC voltage. The converted 3-phase AC voltage is output to motor generator MG1. Inverter 20 converts the 3-phase AC voltage generated by motor generator MG1 using the motive power of engine 2 into DC voltage based on signal PWI1, and provides the converted DC voltage onto positive line PL3.

Inverter 22 responds to a signal PWI2 from ECU 30 to convert DC voltage from positive line PL3 into 3-phase AC voltage. The converted 3-phase AC voltage is output to motor generator MG2. Inverter 22 converts the 3-phase AC voltage generated by motor generator MG2 receiving the rotational force from wheel 6 in a vehicle regenerative braking mode into DC voltage based on signal PWI2, and provides the converted DC voltage onto positive line PL3.

Each of motor generators MG1 and MG2 is a 3-phase AC rotating electric machine, formed of a 3-phase AC synchronous electric motor generator, for example. Motor generator MG1 is regenerative-driven by inverter 20. The 3-phase AC voltage generated using the motive power of engine 2 is output to inverter 20. Motor generator MG1 is driven in a power running mode by inverter 20 at the time of starting engine 2 to crank engine 2 up.

Motor generator MG2 is driven in a power running mode by inverter 22 to generate a driving force for driving the vehicle. Motor generator MG2 is regenerative-driven by inverter 22 in a vehicle regenerative braking mode, and output the 3-phase AC voltage generated using the rotational force received from wheel 6 to inverter 22.

Current sensor 21 detects the value of current flowing between motor generator MG1 and inverter 20 as a motor current value MCRT1, which is output to ECU 30. Current sensor 23 detects the value of current flowing between motor generator MG2 and inverter 22 as a motor current value MCRT2, which is output to ECU 30.

Voltage sensor 42 detects and outputs to ECU 30 a voltage VBA of main power storage device BA. Current sensor 52 detects a current IA flowing between main power storage device BA and converter 10 for output to ECU 30. Temperature sensor 62 detects and provides to ECU 30 temperature TA of main power storage device BA.

Voltage sensors 44 and 46 detect and output to ECU 30 a voltage VB1 of sub power storage device BB1 and VB2 of sub power storage device BB2. Current sensors 54 and 56 detect and output to ECU 30 a current IB1 flowing between sub power storage device BB1 and converter 12, and a current IB2 flowing between sub power storage device BB2 and converter 12. Temperature sensors 64 and 66 detect and output to ECU 30 a temperature TB1 of sub power storage device BB1 and a temperature TB2 of sub power storage device BB2.

Voltage sensor 48 detects and outputs to ECU 30 a voltage across the terminals of capacitor C (voltage VH).

Charger 240 and inlet 241 charge main power storage device BA and sub power storage devices BB1, BB2 using the electric power supplied from outside of hybrid vehicle 1000. The electric power supplied from a power supply external to the vehicle (external power supply) is output to positive line PL2 and negative line NL via inlet 241 and charger 240. Charger 240 is operated and stopped according to signal CHG from ECU 30.

Based on the detected values from voltage sensor 42, temperature sensor 62 and current sensor 52, ECU 30 sets the SOC(M) indicating the remaining capacitance of main power storage device BA, an input upper limit power Win(M) indicating the upper limit value of the charging electric power of main power storage device BA, and the output upper limit power Wout(M) indicating the upper limit value of the discharging electric power from main power storage device BA.

Similarly, based on the detection values from voltage sensor 44 (or 46), temperature sensor 64 (or 66) and current sensor 54 (or 56), ECU 30 sets the SOC(S) indicating the remaining capacitance of sub power storage device BB, an input output upper limit power Win(S) indicating the upper limit value of the charging electric power of sub power storage device BB, and the output upper limit power Wout(S) indicating the upper limit value of the discharging electric power from sub power storage device BB.

Generally, the remaining amount (hereinafter, also referred to as SOC (State of Charge)) is indicated by the ratio (%) of the current charged amount to the fully charged state of each battery. Win and Wout are indicated as the upper limit value of electric power in order to avoid overdischarge or overcharge even if a corresponding power storage device (BA, BB1, BB2) outputs or inputs electric power for a predetermined period of time (for example, approximately 10 seconds).

ECU 30 generates and outputs signals CN1, CN2, and CN3 to control connection units 72, 74 and 76, respectively, ECU 30 generates signals PWC1, SD1 and UA1 for controlling converter 10, and outputs any of these signals to converter 10. ECU 30 generates signals PWC2, SD2 and UA2 for controlling converter 12, and outputs any of these signals to converter 12.

Further, ECU 30 generates and outputs to inverters 20 and 22 signals PWI1 and PWI2 directed to driving inverters 20 and 22, respectively. Moreover, ECU 30 generates and outputs to charger 240 a signal CHG directed to controlling charger 240.

ECU 30 switches the running mode of hybrid vehicle 1000 between a CD (Charge Depletion) mode and CS (Charge Sustain) mode.

The CD mode is a running mode causing generation of the driving force of hybrid vehicle 1000 by motor generator MG2 using the electric power stored in main power storage device BA and sub power storage device BB. During the period of time over which hybrid vehicle 1000 runs in the CD mode, the electric power stored in main power storage device BA and sub power storage device BB is consumed by motor generator MG2. Namely, in the CD mode, the first power source (main power storage device BA, sub power storage device BB, and motor generator MG2) is used having higher priority in the running of the hybrid vehicle.

The CS mode causes generation of the driving force of hybrid vehicle 1000 such that the total SOC of main power storage device BA and sub power storage devices BB1, BB2 is maintained. In this case, ECU 30 controls engine 2 such that it is used having higher priority in the running of the vehicle. For example, in the CS mode, the driving force of hybrid vehicle 1000 is generated by engine 2 alone. In this case, consumption of the electric power stored in main power storage device BA and sub power storage device BB is suppressed.

In the CS mode, engine 2 and motor generator MG2 may generate the driving force of hybrid vehicle 1000. For example, the electric power stored in main power storage device BA and sub power storage device BB is employed to increase the output from motor generator MG2. In a braking mode or decelerating mode of hybrid vehicle 1000, motor generator MG2 is regeneration-driven. The electric power generated by motor generator MG2 is stored in main power storage device BA or sub power storage device BB. Namely, in the CS mode, electric power may be transmitted/received between main and sub power storage devices BA and BB and motor generator MG2. In the CS mode, the charging/discharging of main power storage device BA and sub power storage device BB is controlled such that the total SOC is maintained even in such a case.

Hybrid vehicle 1000 further includes a signal generation circuit 80 generating a signal MD directed to switching the running mode, and a control line 81 through which a signal MD is transmitted to ECU 30 from signal generation circuit 80. Signal generation circuit 80 includes a switch 82 that is operated manually.

When switch 82 is operated by the driver, signal generation circuit 80 generates signal MD. ECU 30 responds to signal MD to switch the running mode between the CD mode and CS mode, and controls the first power source and second power source according to the selected running mode.

ECU 30 controls connection units 72-76, converters 10, 12, and charger 240 during a charging mode of main power storage device BA and sub power storage devices BB1 and BB2. When the charging of main power storage device BA and sub power storage devices BB1 and BB2 is completed, ECU 30 sets the running mode at the CD mode. Namely, when the vehicle system shown in FIG. 1 is actuated for the first time after the charging of main power storage device BA and sub power storage devices BB1 and BB2 is completed, the running mode is set to the CD mode.

Figure 2:
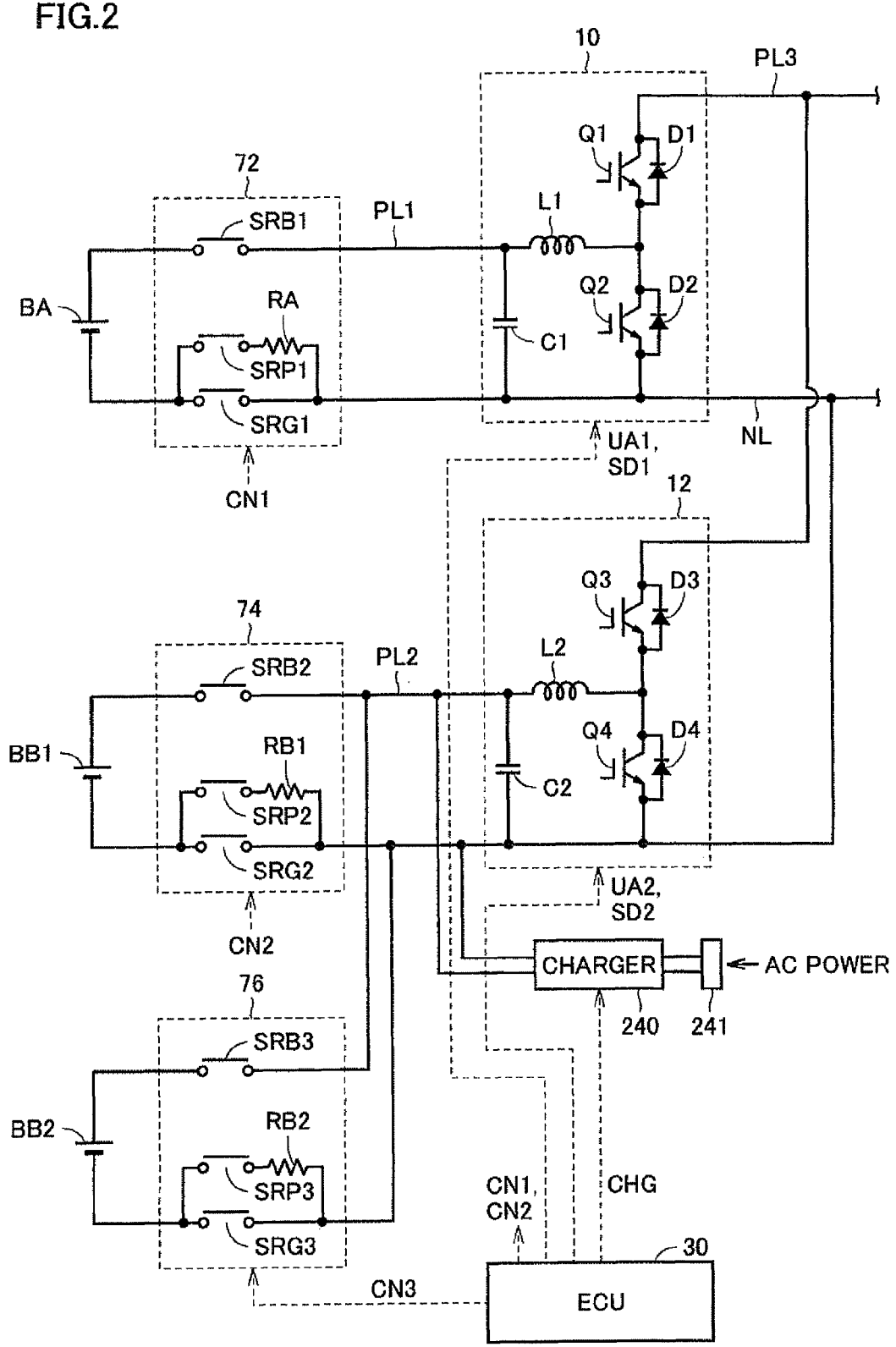
FIG. 2 is a circuit diagram representing a configuration of converters 10 and 12 and connection units 72-76 shown in FIG. 1.

FIG. 2 is a circuit diagram representing a configuration of converters 10, 12 and connection units 72-76 shown in FIG. 1.

Referring to FIG. 2, converter 10 includes semiconductor switching elements Q1 and Q2 directed to electric power, diodes D1 and D2, a reactor L1, and a capacitor C1.

Although an IGBT (Insulated Gate Bipolar Transistor) is employed as the power-directed semiconductor switching element (hereinafter, also referred simply as "switching element") in the present embodiment, any arbitrary switching element can be applied as long as the ON/OFF can be controlled by a control signal. For example, an MOSFET (Metal Oxide Semiconductor Field Effect Transistor), or a bipolar transistor may be applied as the power-directed semiconductor switching element.

Switching elements Q1 and Q2 are connected in series between positive line PL3 and negative line NL. Diodes D1 and D2 are connected anti-parallel to switching elements Q1 and Q2, respectively. Reactor L1 has one end connected to the connection node of switching elements Q1 and Q2, and the other end connected to positive line PL1. Capacitor C1 is connected to positive line PL1 and negative line NL.

Converter 12 has a configuration similar to that of converter 10. The configuration of converter 12 corresponds to the configuration of converter 10, provided that switching elements Q1 and Q2 are replaced with switching elements Q3 and Q4, respectively, diodes D1 and D2 are replaced with diodes D3 and D4, respectively, reactor L1, capacitor C1 and positive line PL1 are replaced with reactor L2, capacitor C2, and positive line PL2, respectively.

Switching elements Q1 and Q2 correspond to the upper arm and lower arm, respectively, of converter 10. Similarly, switching elements Q3 and Q4 correspond to the upper arm and lower arm, respectively, of converter 12.

Converters 10 and 12 are formed of a chopper circuit. Converter 10 (12) responds to a signal PWC1 (PWC2) from ECU 30 (FIG. 1) to boost the voltage on positive line PL1 (PL2) using reactor L1 (L2), and provides the boosted voltage onto positive line PL3. Specifically, the boosting ratio of the output voltage from main power storage device BA and sub power storage device BB can be controlled by adjusting the ON/OFF period ratio (duty) of switching element Q1 (Q3) and/or switching element Q2 (Q4).

Converter 10 (12) responds to a signal PWC1 (PWC2) from ECU 30 (not shown) to down-convert the voltage on positive line PL3, and provides the down-converted voltage onto positive line PL1 (PL2). Specifically, the down-converting ratio of the voltage on positive line PL3 can be controlled by adjusting the ON/OFF period ratio (duty) of switching element Q1 (Q3) and/or switching element Q2 (Q4).

Connection unit 72 includes a system main relay SRB1 connected between the positive electrode of main power storage device BA and positive line PL1, a system main relay SRG1 connected between the negative electrode of main power storage device BA and negative line NL, and a system main relay SRP1 and a limiting resistor RA connected in series between the negative electrode of main power storage device BA and negative line NL, and provided parallel to system main relay SRG1. System main relays SRB1, SRP1, and SRG1 have their conducting state (ON)/non-conducting state (OFF) controlled by a signal CN1 applied from ECU 30.

Connection units 74 and 76 have a configuration similar to that of connection unit 72 set forth above. Specifically, the configuration of connection unit 74 corresponds to the configuration of connection unit 72 set forth above, provided that main power storage device BA is replaced with sub power storage device BB1, system main relays SRB1, SRP1, and SRG1 are replaced with system main relays SRB2, SRP2, and SRG2, respectively, and limiting resistor RA is replaced with a limiting resistor RB1. Each system main relay in connection unit 74 has the conducting state and non-conducting state controlled by signal CN2 from ECU 30.

Further, the configuration of connection unit 76 corresponds to the configuration of connection unit 72 set forth above, provided that main power storage device BA is replaced with sub power storage device BB2, system main relays SRB1, SRP1, and SRG1 are replaced with system main relays SRB3, SRP3, and SRG3, respectively, and limiting resistor RA is replaced with a limiting resistor RB2. Each system main relay in connection unit 76 has the conducting state and non-conducting state controlled by signal CN3 from ECU 30.

In the present embodiment, inlet 241 receives AC power from a source external to the vehicle. ECU 30 transmits signal CHG to charger 240. Charger 240 responds to signal CHG to convert the AC power from inlet 241 into DC power.

In a charging mode of main power storage device BA, ECU 30 transmits signals CN2 and CN3 to connection units 74 and 76, respectively, in order to set connection units 74 and 76 OFF. Furthermore, ECU 30 transmits a signal CN1 to connection unit 72 in order to set connection unit 72 ON. ECU 30 transmits a signal UA1 to converter 10 and a signal SD2 to converter 12. Converter 10 responds to signal UA1 to switch the upper arm (switching element Q1) ON, and the lower arm (switching element Q2) OFF. Converter 12 responds to signal SD2 to switch the upper arm and lower arm OFF. The DC power output from charger 240 passes through reactor L2, diode D3, switching element Q1, reactor L1 and connection unit 72 to be supplied to main power storage device BA. Thus, main power storage device BA is charged.

During a charging mode of sub power storage device BB1, ECU 30 transmits signals CN1 and CN3 to connection units 72 and 76, respectively, in order to switch connection units 72 and 76 OFF. Furthermore, ECU 30 transmits a signal CN2 to connection unit 74 directed to switching connection unit 74 ON. ECU 30 also transmits signal SD1 to converter 10 and signal SD2 to converter 12. Converter 10 (12) switches the upper arm and lower arm OFF according to signal SD1 (SD2). The DC power output from charger 240 passes through connection unit 74 to be supplied to sub power storage device BB1. Accordingly, sub power storage device BB1 is charged.

During a charging mode of sub power storage device BB2, ECU 30 transmits signals CN1 and CN2 to connection units 72 and 74, respectively, in order to switch connection units 72 and 74 OFF. Furthermore, ECU 30 transmits a signal CN3 to connection unit 76 directed to switching connection unit 76 ON. ECU 30 also transmits signal SD1 (SD2) to converter 10 (12). The DC power output from charger 240 passes through connection unit 76 to be supplied to sub power storage device BB2. Accordingly, sub power storage device BB2 is charged.

Figure 3:
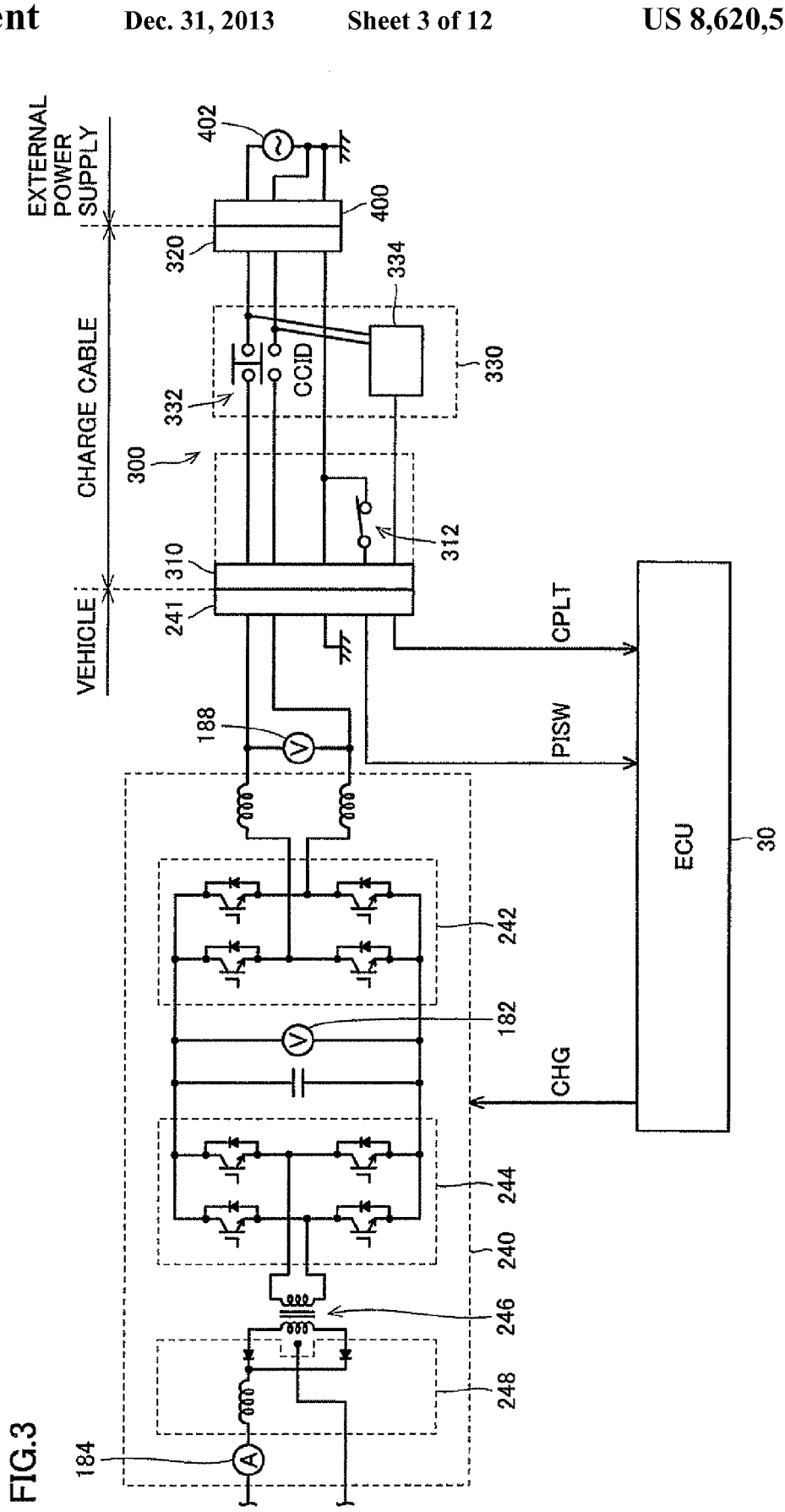
FIG. 3 shows in detail a configuration of charger 240, and a charge cable 300 connecting the hybrid vehicle with an external power supply.

FIG. 3 is a diagram showing in detail the configuration of charger 240, and the configuration of charge cable 300 connecting the hybrid vehicle with an external power supply.

Referring to FIG. 3, charger 240 includes an AC/DC conversion circuit 242, a DC/AC conversion circuit 244, an insulation transformer 246, and a rectifying circuit 248.

AC/DC conversion circuit 242 is formed of a single-phase bridge circuit. AC/DC conversion circuit 242 converts AC power into DC power based on signal CHG from ECU 30. AC/DC conversion circuit 242 also functions as a boosting chopper circuit for boosting the voltage by using the coil as a reactor.

DC/AC conversion circuit 244 is formed of a single-phase bridge circuit. DC/AC conversion circuit 244 converts the DC power into AC power of high frequency for output to insulation transformer 246 based on signal CHG from ECU 30.

Insulation transformer 246 includes a core formed of a magnetic material, and a primary coil and secondary coil wound around the core. The primary coil and secondary coil are electrically insulated, and connected to DC/AC conversion circuit 244 and rectifying circuit 248, respectively. Insulation transformer 246 converts the AC power of high frequency received from DC/AC conversion circuit 244 to a voltage level corresponding to the ratio of the windings of the primary coil and secondary coil for output to rectifying circuit 248. Rectifying circuit 248 rectifies the AC power output from insulation transformer 246 into DC power.

The voltage between AC/DC conversion circuit 242 and DC/AC conversion circuit 244 (voltage across the terminals of the smooth capacitor) is detected by voltage sensor 182. A signal representing a detection result is applied to ECU 30. The output current from charger 240 is detected by current sensor 184. A signal representing the detected result is applied to ECU 30.

ECU 30 generates and provides to charger 240 a signal CHG directed to driving charger 240, when main power storage device BA and sub power storage devices BB1, BB2 are charged by a power supply 402 external to the vehicle.

ECU 30 is capable of fail detection of charger 240, in addition to controlling charger 240. When the voltage detected by voltage sensor 182, the current detected by current sensor 184, or the like is greater than the threshold value, failure of charger 240 is detected.

Inlet 241 is provided, for example, at the side portion of the hybrid vehicle. Connector 310 of charge cable 300 connecting the hybrid vehicle with an external power supply 402 is connected to inlet 241.

Charge cable 300 includes connector 310, a plug 320, and a CCID (Charging Circuit Interrupt Device) 330.

Connector 310 is connected to inlet 241. Connector 310 is provided with a switch 312. Switch 312 is closed when connector 310 is connected to inlet 241. When switch 312 is closed, a cable connection signal PTSW indicating that connector 310 is connected to inlet 241 is input to ECU 30. For example, switch 312 is open/closed in cooperation with a locking member (not shown) that fastens connector 310 of charge cable 300 to inlet 241 of the hybrid vehicle.

Plug 320 of charge cable 300 is connected to a receptacle 400. Receptacle 400 is, for example, a plug socket provided at an establishment. AC power is supplied from a power supply 402 to receptacle 400.

CCID 330 includes a relay 332 and a control pilot circuit 334. In an open state of relay 332, supply of electric power from power supply 402 to the hybrid vehicle is cut. In a closed state of relay 332, electric power can be supplied from power supply 402 to the hybrid vehicle. The state of relay 332 is controlled by ECU 30 with connector 310 of charge cable 300 connected to inlet 241 of the hybrid vehicle.

Control pilot circuit 334 delivers a pilot signal (square wave signal) CPLT onto the control pilot line in a state of plug 320 of charge cable 300 being connected to receptacle 400, i.e. to external power supply 402, and connector 310 being connected to inlet 241. Pilot signal CPLT changes periodically by an oscillator (not shown) provided in control pilot circuit 334.

Control pilot circuit 334 can output a predetermined pilot signal CPLT even if connector 310 is detached from inlet 241 in the case where plug 320 is connected to receptacle 400. It is to be noted that ECU 30 cannot detect pilot signal CPLT, if output in a state of connector 310 being detached from inlet 241.

In the case where plug 320 is connected to receptacle 400 and connector 310 is connected to inlet 241, control pilot circuit 334 generates a pilot signal CPLT having a predetermined pulse width (duty cycle).

According to the pulse width of a pilot signal CPLT, the hybrid vehicle is notified about the current amount that can be supplied. For example, the hybrid vehicle is notified of the current capacity of charge cable 300. The pulse width of pilot signal CPLT does not depend on the voltage and current of power supply 402, and is constant.

The pulse width of pilot signal CPLT may differ if the type of the charge cable used is different. Namely, the pulse width of pilot signal CPLT may be determined for every type of the charge cable.

In the present embodiment, main power storage device BA and sub power storage devices BB1, BB2 are charged in a state of the hybrid vehicle and power supply 402 connected by charge cable 300. AC voltage VAC of power supply 402 is detected by voltage sensor 188 provided in the hybrid vehicle. The detected voltage VAC is transmitted to ECU 30.

Figure 4:
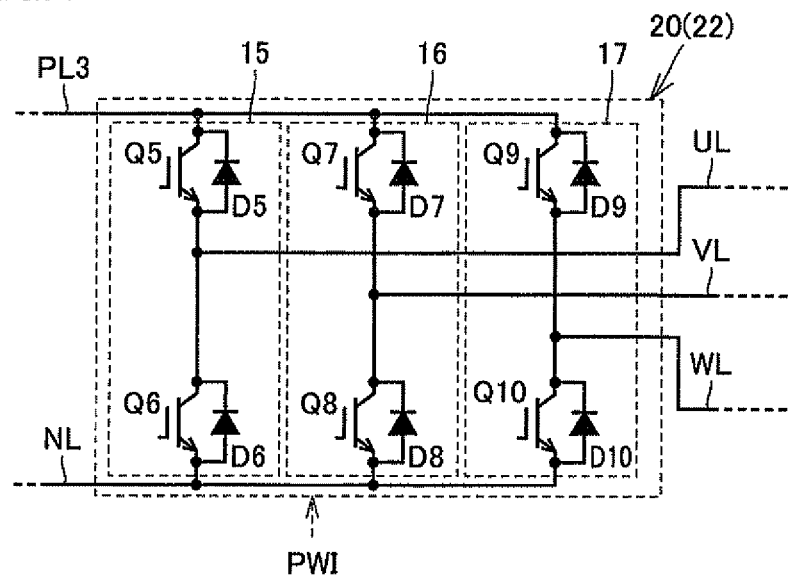
FIG. 4 is a circuit diagram representing a detailed configuration of inverters 20 and 22 of FIG. 1.

FIG. 4 is a circuit diagram representing in detail a configuration of inverters 20 and 22 of FIG. 1.

Referring to FIG. 4, inverter 20 includes a U-phase arm 15, a V-phase arm 16, and a W-phase arm 17. U-phase arm 15, V-phase arm 16, and W-phase arm 17 are connected in parallel between positive line PL3 and negative line NL.

U-phase arm 15 includes switching elements Q5 and Q6 connected in series between positive line PL3 and negative line NL, and diodes D5 and D6 connected anti-parallel to switching elements Q5 and Q6, respectively. V-phase arm 16 includes switching elements Q7 and Q8 connected in series between positive line PL3 and negative line NL, and diodes D7 and D8 connected anti-parallel to switching elements Q7 and Q8, respectively. W-phase arm 17 includes switching elements Q9 and Q10 connected in series between positive line PL3 and negative line NL, and diodes D9 and D10 connected anti-parallel to switching elements Q9 and Q10, respectively.

The intermediate point of each phase arm is connected to each phase end of each phase coil in motor generator MG1. Specifically, motor generator MG1 is a 3-phase permanent magnet synchronous motor. The three coils of the U, V and W-phase each have one ends connected to the neutral point. The U-phase coil has its other end connected to a line UL led out from the connection node of switching elements Q5 and Q6. The V-phase coil has its other end connected to line VL led out from the connection node of switching elements Q7 and Q8. The W-phase coil has its other end connected to line WL led out from the connection node of switching elements Q9 and Q10.

The internal circuit configuration of inverter 22 of FIG. 1 is similar to that of inverter 20, provided that it is connected to motor generator MG2. Therefore, detailed description will not be repeated. FIG. 4 illustrates signal PWI applied to the inverter. Signal PWI is a generic representation of signals PWI1 and PWI2. As shown in FIG. 1, signals PWI1 and PWI2 are applied to inverters 20 and 22, respectively.

Figure 5:
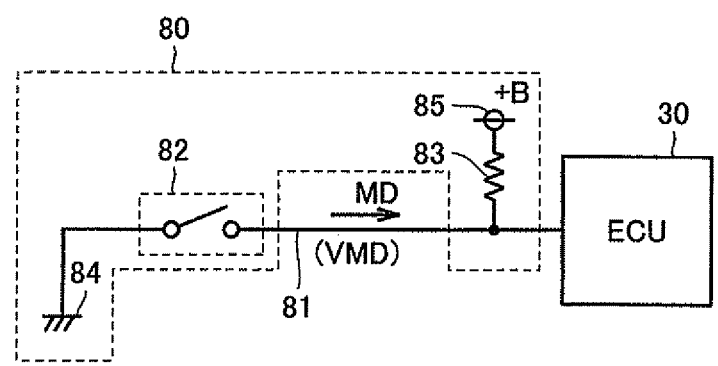
FIG. 5 is a circuit diagram of a signal generation circuit 80 of FIG. 1.

FIG. 5 is circuit diagram of signal generation circuit 80 of FIG. 1.

Referring to FIG. 5, signal generation circuit 80 includes a switch 82, a resistor 83, a ground node 84, and a power supply node 85.

Switch 82 connects control line 81 with ground node 84 in an ON state. Switch 82 disconnects control line 81 from ground node 84 in an OFF state. Resistor 83 is connected between power supply node 85 and control line 81. Voltage +B of the power supply node is higher than the voltage of ground node 84 (set at 0).

Switch 82 is formed of a momentary switch. A momentary switch maintains a predetermined state only during operation, and automatically returns to the initial state when the operation ends. In the present embodiment, switch 82 maintains an ON state only when operated, and returns to an OFF state when the operation ends.

Figure 6:
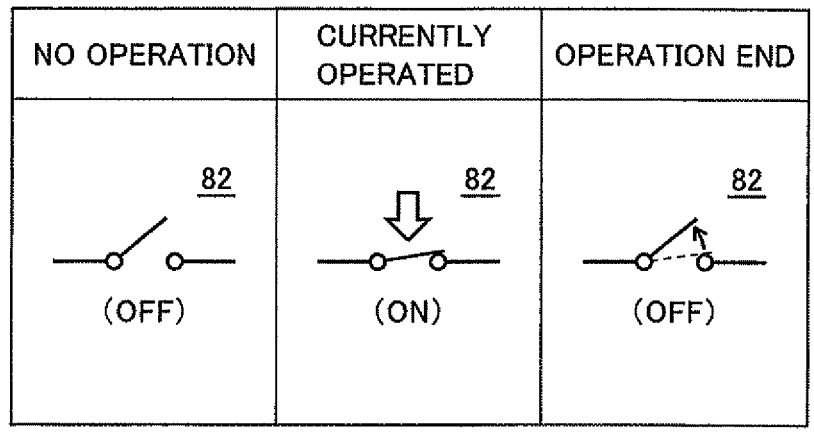
FIG. 6 is a diagram to describe an operation of a switch 82.

FIG. 6 is a diagram to describe an operation of switch 82.

Referring to FIG. 6, switch 82 is at an OFF state when not operated by a user (for example, the driver). Switch 82 attains an ON state through a manual operation by the user (for example, depressing the button provided for the switch). During the operation of switch 82 (for example, when the button is depressed), switch 82 is held at an ON state. When the manual operation ends, switch 82 returns to the initial state (that is, OFF state).

Figure 7:
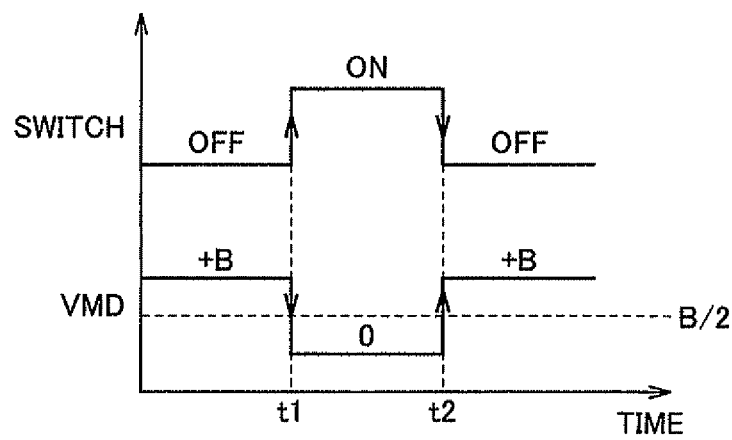
FIG. 7 represents the corresponding relationship between a state of switch 82 and the voltage of a signal MD.

FIG. 7 represents the corresponding relationship between the state of switch 82 and the voltage of signal MD. The voltage of signal MD corresponds to the voltage of control line 81. Referring to FIG. 6, switch 82 is at an OFF state prior to time t1. When switch 82 is at an OFF state, the voltage of signal MD (voltage VMD that is the voltage of control line 81) is +B. At time t1, switch 82 attains an ON state by a manual operation. Accordingly, voltage VMD changes from +B to 0. At time t2, switch 82 returns to the OFF state by ending the manual operation. Accordingly, voltage VMD changes from 0 to +B. During the period from time t1 to time t2, voltage VMD is 0 since switch 82 is maintained at an ON state.

Voltage VMD is defined to be at an "H level" and at an "L level" when the value is higher than and lower than the threshold value (let the threshold value be B/2), respectively. Specifically, when voltage VMD is +B, voltage VMD is at the H level. When voltage VMD is 0, voltage VMD is at an L level. For the sake of describing the level of voltage VMD, it is assumed that the threshold value (B/2) is designated in other drawings.

Figure 8:
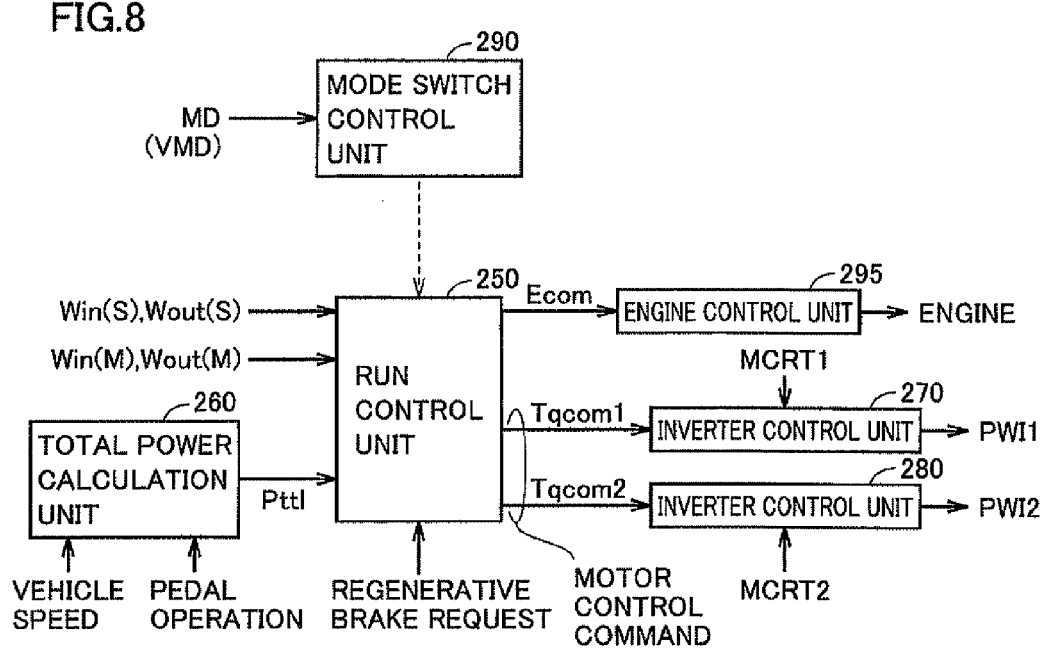
FIG. 8 is a functional block diagram for describing a configuration of a running control system of a hybrid vehicle 1000 included in ECU 30.

FIG. 8 is a functional block diagram describing a configuration of a running control system of hybrid vehicle 1000, included in ECU 30. Specifically, FIG. 8 represents a control configuration related to power distribution control between engine 2 and motor generators MG1, MG2. Each functional block shown in FIG. 8 can be realized by executing a predetermined program that is stored in advance by ECU 30 and/or by functional processing by an electronic circuit (hardware) in ECU 30.

Referring to FIG. 8, total power calculation unit 260 calculates the overall required power (total required power Pttl) of hybrid vehicle 1000 based on the vehicle speed and operated level of the accelerator pedal (not shown). Total required power Pttl may also include the power (engine output)

required for generating the battery charging power by motor generator MG1 according to the state of the vehicle.

Run control unit 250 receives input and output upper limit powers Win(M) and Wout(M) of main power storage device BA, input and output upper limit powers Win(S) and Wout(S) of sub power storage device BB, total required power Pttl from total power calculation unit 260, and the regenerative brake request when the brake pedal is operated to generate torque command values Tqcom1 and Tqcom2 as the motor control command. At this stage, run control unit 250 generates torque command values Tqcom1 and Tqcom2 such that the total of the input and output power of motor generators MG1 and MG2 does not exceed the total of the input upper limit power (Win(M)+Win(S)) and the total of the output upper limit power (Wout(M)+Wout(S)) of main power storage device BA and sub power storage device BB.

Further, run control unit 250 divides the total required power Pttl into the vehicle driving power by motor generator MG2 and the vehicle driving power by engine 2. When the running mode is in the CD mode, the division of the vehicle driving power is determined such that the electric power stored at the power storage device is used as much as possible. Therefore, the operation of engine 2 is suppressed. When the running mode is in the CS mode, the vehicle driving power by engine 2 is set such that engine 2 operates at high efficiency. By such control, the fuel consumption rate of the hybrid vehicle can be improved.

Inverter control unit 270 generates control signal PWI1 of inverter 20 based on torque command value Tqcom1 and motor current value MCRT1 of motor generator MG1. Similarly, inverter control unit 280 generates control signal PWI2 of inverter 22 based on torque command value Tqcom2 and motor current value MCRT2 of motor generator MG2.

Run control unit 250 sets the required value of the vehicle driving power through the engine, and generates an engine control command Ecom based on the required value. Engine control command Ecom is output to engine control unit 295. Engine control unit 295 controls the operation of engine 2 according to engine control command Ecom.

A mode switch control unit 290 receives signal MD. Mode switch control unit 290 determines whether the condition for switching the running mode is satisfied or not based on voltage VMD of signal MD. When a determination is made that the condition for switching the running mode is satisfied, mode switch control unit 290 outputs to run control unit 250 an instruction to switch the running mode. Run control unit 250 switches the running mode between the CD mode and CS mode according to an instruction from mode switch control unit 290.

When a determination is made that the condition for switching the running mode is not satisfied, mode switch control unit 290 does not output an instruction to switch the running mode. In this case, switching of the running mode by run control unit 250 is not executed.

When the running mode is in the CD mode, hybrid vehicle 1000 runs positively using the electric power stored in main power storage device BA and sub power storage device BB. When total required power Pttl is less than or equal to the upper limit (Wout(M)+Wout(S)) of the entire output power from the power storage devices, hybrid vehicle 1000 runs only by the vehicle driving power through motor generator MG2. When the total required power Pttl exceeds the upper limit (Wout(M)+Wout(S)) of the entire output power from the power storage devices while in the CD mode, engine 2 is started to cause the vehicle driving power to be generated by engine 2. Specifically, in the CD mode, the first power source (main power storage device BA, sub power storage device BB and motor generator MG2) are used having higher priority in the running of hybrid vehicle 1000.

In the CD mode, the charging and discharging of main power storage device BA and sub power storage device BB are controlled such that the electric power of sub power storage device BB is used having higher priority than the electric power of main power storage device BA. In the case where the storage state of sub power storage device BB is degraded during the run of hybrid vehicle 1000 (for example, when SOC becomes lower than the predetermined threshold value), sub power storage device BB connected to converter 12 is altered. For example, in the case where sub power storage device BB1 is selected as sub power storage device BB at the time of actuating the vehicle system, sub power storage device BB1 is disconnected from converter 12, and sub power storage device BB2 is connected to converter 12 as the new sub power storage device BB.

When the running mode is in the CS mode, the vehicle driving power is divided between engine 2 and motor generator MG2 such that the total SOC is maintained at a predetermined target value. In this case, engine 2 is mainly used for the running of hybrid vehicle 1000.

By the charging of main power storage device BA and sub power storage devices BB1, BB2 through the external power supply and charger 240, sufficient electric power will be stored at main power storage device BA and sub power storage devices BB1, BB2. Therefore, when the vehicle system is actuated for the first time after completion of the charging of main power storage device BA and sub power storage devices BB1, BB2, the running mode is set in the CD mode.

Figure 9:
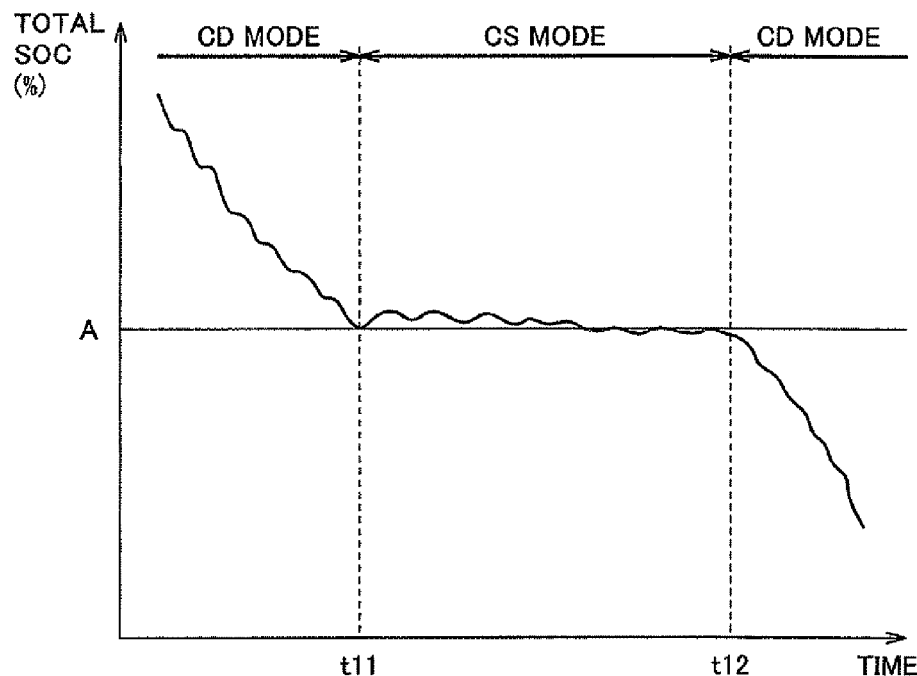
FIG. 9 is a diagram to describe switching of the running mode.

FIG. 9 is a diagram to describe the switching of the running mode. Referring to FIG. 9, the running mode of hybrid vehicle 1000 is at the CD mode prior to time t11. In the CD mode, the total SOC becomes lower over time since the electric power is supplied from main power storage device BA and sub power storage device BB to motor generator MG2

At time t11, the driver operates switch 82. In response, the running mode is switched from the CD mode to the CS mode. In the CS mode, run control unit 250 (refer to FIG. 8) executes the control of charging/discharging of main power storage device BA and sub power storage device BB such that the total SOC is maintained at a target value A. For example, the SOC value at the point in time when switch 82 is operated (time t11) is employed as target value A.

At time t12, the driver operates switch 82 again. Accordingly, the running mode is switched from the CS mode to the CD mode.

Thus, by once setting the running mode at the CS mode, the total SOC can be preserved. Accordingly, EV (Electric Vehicle) running in which engine 2 is not used can be realized at the desired zone.

In the case where the driver does not operate switch 82, the total SOC continues to become lower as a result of continuing to run in the CD mode. When the total SOC becomes lower than a predetermined lower limit, engine 2 is used for the run of hybrid vehicle 1000.

<Running Mode Switch Control>

Figure 10:
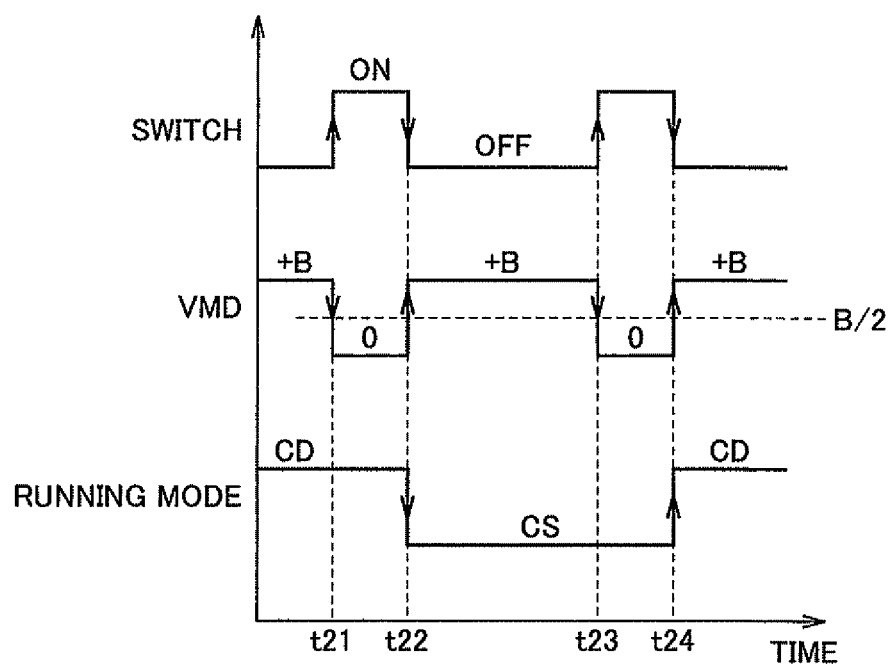
FIG. 10 is a timing chart for describing switching control of the running mode according to the first embodiment.

FIG. 10 is a timing chart for describing switching control of the running mode according to the first embodiment.

Referring to FIG. 10, switch 82 changes from an OFF state to an ON state by manual operation at time t21. In response, voltage VMD changes from +B to 0. In other words, voltage VMD changes from the H level to the L level by switch 82 changing from an OFF state to an ON state.

At time t22, the operation of switch 82 ends. Accordingly, switch 82 returns to an OFF state from an ON state. In response, voltage VMD changes from 0 to +B. In other words, voltage VMD changes from the L level to the H level by switch 82 changing from an ON state to an OFF state.

In the first embodiment, ECU 30 switches the running mode when voltage VMD changes from the H level to the L level, and changes from the L level to the H level. As shown in FIG. 10, voltage VMD changes from the H level to the L level at time t21, and changes from the L level to the H level at time t22. ECU 30 switches the running mode from the CD mode to the CS mode at time t22.

In a similar manner, voltage VMD changes from the H level to the L level at time t23, and changes from the L level to the H level at time t24. ECU 30 switches the running mode from the CS mode to the CD mode at time t24.

The control of switching the running mode when switch 82 is operated will be described with a comparative example of the switching control of the running mode according to the first embodiment. According to this control, the running mode is switched when voltage VMD changes from the H level to the L level. Therefore, when the state of switch 82 changes as shown in FIG. 10, the running mode is switched from the CD mode to the CS mode at time t21, and switched from the CS mode to the CD mode at time t23.

In the case where control is carried out according to the comparative example, the running mode cannot be switched properly when control line 81 is short-circuited to the ground node.

Figure 11:
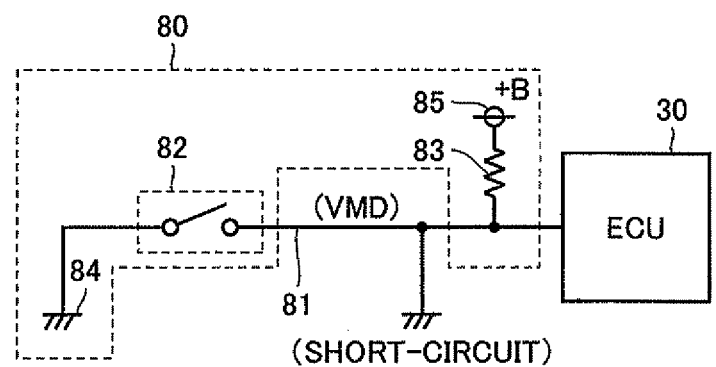
FIG. 11 represents the state where control line 81 is short-circuited to the ground node.

FIG. 11 represents the state of control line 81 short-circuited to the ground node. Referring to FIG. 11, voltage VMD of control line 81 changes from +B to 0 by control line 81 being short-circuited to the earth (ground node). In other words, voltage VMD changes from the H level to the L level.

Figure 12:
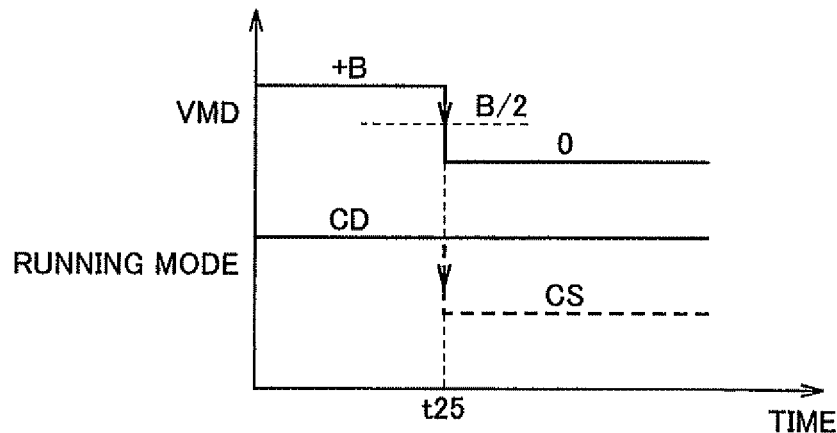
FIG. 12 is a timing chart for the comparison between switching control of the running mode according to the first embodiment and switching control of the running mode according to a comparative example of the first embodiment.

FIG. 12 is a timing chart for comparing the running mode switching control according to the first embodiment and the running mode switching control according to a comparative example of the first embodiment. Referring to FIG. 12, voltage VMD changes from +B to 0 at the point in time when control line 81 is short-circuited to ground node 84 (time t25). Since control line 81 cannot be disconnected from the ground node when control line 81 is short-circuited to the ground node, voltage VMD cannot be changed from the H level to the L level.

According to the comparative example, the running mode is switched from the CD mode to the CS mode at time t25. The running mode is held at the CS mode from time t25 onward.

In the present embodiment, a momentary switch is employed for switch 82. Furthermore, according to the present embodiment, the running mode is switched when voltage VMD changes from the H level to the L level, and from the L level to the H level. In the case where control line 81 is short-circuited to ground node 84, voltage VMD will change from the H level to the L level, but not return to the H level from the L level. Therefore, the running mode is not switched in such a case in the present embodiment.

The present invention allows erroneous switching of the running mode to be prevented in the case where control line 81 is short-circuited to the ground node. Furthermore, the event of the vehicle continuing to run in a running mode differing from the proper running mode can be avoided in the present embodiment.

Figure 13:
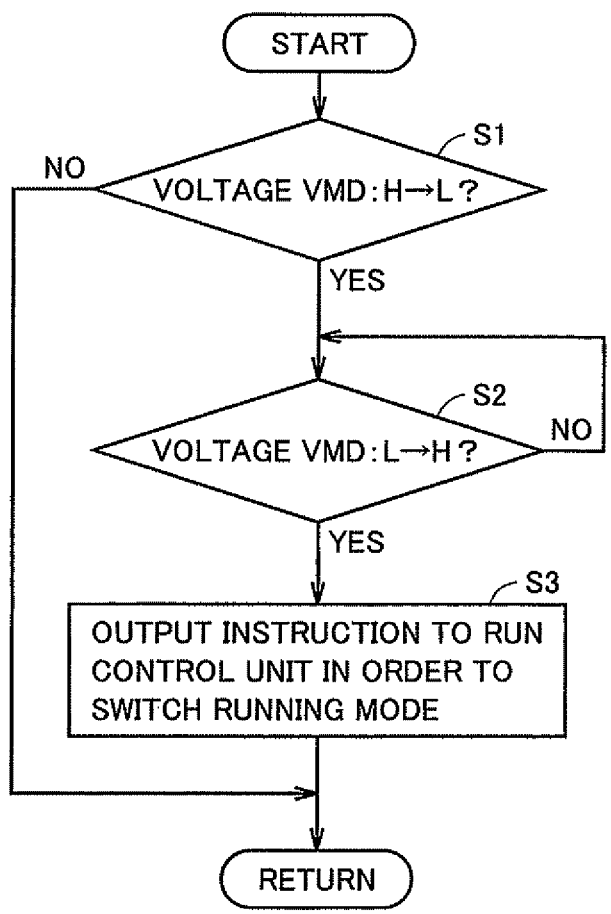
FIG. 13 is a flowchart for describing switching control of the running mode according to the first embodiment.

FIG. 13 is a flowchart to describe switching control of the running mode according to the first embodiment. The process in the flowchart is in invoked from the main routine for every predetermined period, and executed by mode switch control unit 290 (refer to FIG. 8).

Referring to FIG. 13, mode switch control unit 290 determines whether voltage VMD has changed from the H level to the L level (step S1).

For example, mode switch control unit 290 determines a change in the level of voltage VMD as set forth below. First, mode switch control unit 290 compares the value of voltage VMD with a threshold value (for example B/2) to determine the voltage level of VMD. Mode switch control unit 290 determines that the level of voltage VMD has changed when the level of voltage VMD at a first point in time differs from the level of voltage VMD at a second point in time.

When a determination is made that voltage VMD has not changed from the H level to the L level (NO at step S1), the entire processing is returned to the main routine. When mode switch control unit 290 determines that voltage VMD has changed from the H level to the L level (YES at step S1), the process of step S2 is executed. Specifically, at step S2, mode switch control unit 290 determines whether voltage VMD has changed from the L level to the H level.

When a determination is made that voltage VMD has not changed from the L level to the H level (NO at step S2), the process of step S2 is repeatedly executed. In other words, the process of step S2 is repeatedly executed when voltage VMD is at the H level.

When a determination is made that voltage VMD has changed from the L level to the H level (YES at step S2), mode switch control unit 290 outputs an instruction towards run control unit 250 to switch the running mode (step S3). Run control unit 250 switches the running mode in response to the instruction from mode switch control unit 290. When the process of step S3 ends, the overall processing is completed.

In the case where control line 81 is proper and switch 32 is operated, detection is made of voltage VMD changing from the H level to the L level (YES at step S1), and then detection is made of voltage VMD changing from the L level to the H level (YES at step S2). In this case, mode switch control unit 290 outputs to run control unit 250 an instruction to switch the running mode (step S3). Run control unit 250 switches the running mode according to this instruction. Therefore, the running mode is switched properly.

In the case where control line 81 is short-circuited to the earth (ground node), detection is made that voltage VMD has changed from the H level to the L level (YES at step S1). However, voltage VMD will not return to the H level from the L level. Therefore, the determination process of step S2 will be repeated. In this case, mode switch control unit 290 will not output an instruction to switch the running mode to run control unit 250. Therefore, the running mode is not switched.

According to the first embodiment, switch 82 is formed of a momentary switch. Specifically, switch 82 electrically couples control line 81 with ground node 84 during the period of time over which manual operation is executed, couples control line 81 with power supply node 85 via resistor 83 when manual operation is not executed.

Based on the first change of the voltage level at control line 81 (the change from H level to L level) and the second change of the voltage level at control line 81 (the change from L level to H level), ECU 30 switches the running mode of hybrid vehicle 1000 between the first mode (CD mode) and the second mode (CS mode). Thus, the event of the vehicle continuing to run in a mode differing from the proper running mode when an error occurs at control line 81 (when control line 81 is short-circuited to the earth) can be avoided.

In particular, the hybrid vehicle according to the present embodiment takes the CD running mode at the time of starting running. In the case where the running mode is switched from the CD mode to the CS mode by the shorting of control line 81, the distance by EV running will become shorter. However, the present embodiment can avoid the event of the distance by EV running being shortened by the shorting of control line 81.

Second Embodiment

The configuration of a hybrid vehicle according to a second embodiment is similar to that of the hybrid vehicle of the first embodiment. Therefore, description thereof will not be repeated. The second embodiment differs from the first embodiment in the switching control of the running mode.

Figure 14:
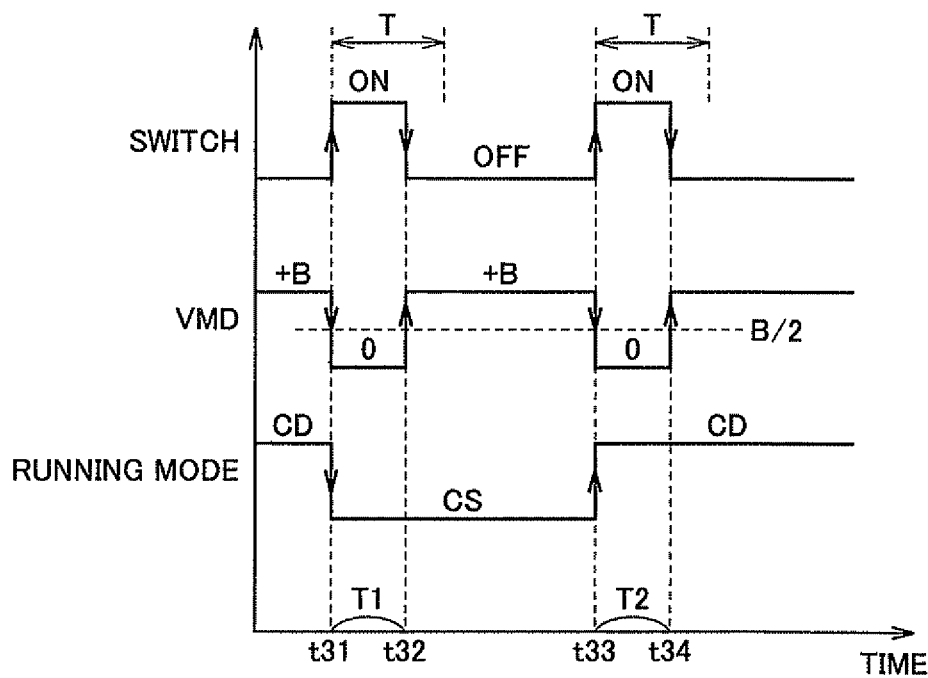
FIG. 14 is a timing chart for describing switching control of the running mode according to a second embodiment.

FIG. 14 is a timing chart to describe switching control of the running mode according to the second embodiment.

Referring to FIGS. 14 and 10, the change in the state of switch 82 and the change in voltage VMD during the period from time t31 to time t32 is identical to the change in the state of switch 82 and the change in voltage VMD, respectively, during the period from time t21 to time t22.

In the second embodiment, the running mode is switched when voltage VMD changes from the H level to the L level. Specifically, the running mode is switched from the CD mode to the CS mode at time t31.

In the case where voltage VMD changes from the L level to the H level before the elapse of a predetermined period of time T from time t31, the running mode is settled at the mode attained after switching. At time t32, voltage VMD changes from the H level to the L level. The period of time T1 from time t31 to time t32 is shorter than a predetermined period of time T. Therefore, the running mode is settled at the CS mode at time t32.

The change in the state of switch 82 and the change in voltage VMD during the period of time from time t33 to time t34 are similar to the change in the state of switch 82 and the change in voltage VMD during the period of time from time t31 to time t32. At time t33, the running mode is switched from the CS mode to the CD mode. Period of time T2 from time t33 to time t34 is shorter than the predetermined period of time T. Therefore, the running mode is settled at the CD mode at time t34.

Thus, the running mode is switched at the point in time when voltage VMD changes from the H level to the L level in the second embodiment. In the case where voltage VMD changes from the L level to the H level before the elapse of a predetermined period of time T from the point in time when the running mode is switched, the running mode is settled at the mode attained after switching.

Figure 15:
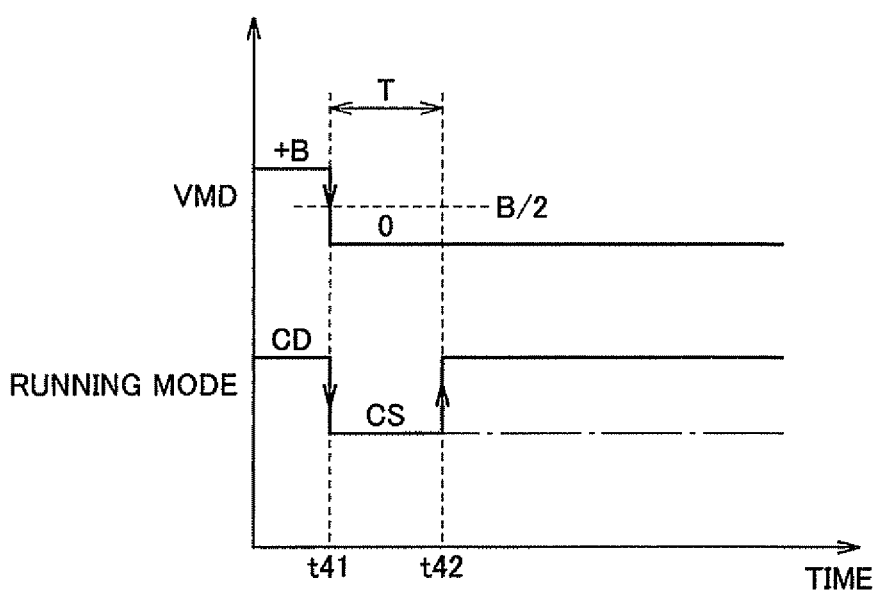
FIG. 15 is a diagram for describing change in voltage VMD when control line 81 is short-circuited to the earth, and switching control of the running mode according to the second embodiment.

FIG. 15 is a diagram to describe the change in voltage VMD when control line 81 is short-circuited to the earth, and the switching control of the running mode according to the second embodiment.

Referring to FIG. 15, voltage VMD changes from +B to 0 when control line 81 is short-circuited to the earth. However, voltage VMD remains at 0 even after the elapse of predetermined period of time T from the point in time when voltage VMD has changed (time t41).

In the case where voltage VMD does not change from the L level to the H level even at the elapse of predetermined period of time T from the point in time when voltage VMD changes from the H level to the L level, the running mode is returned to the mode set prior to switching. At time t42, the running mode is switched from the CS mode to the CD mode. Therefore, according to the second embodiment, the event of the vehicle continuously running at a mode differing from the proper running mode when an error occurs at control line 81 (when control line 81 is short-circuited to the earth) can be avoided.

The length of predetermined period of time T is set to approximately the general operating time of switch 82 (although not particularly limited, approximately several seconds, for example).

Figure 16:
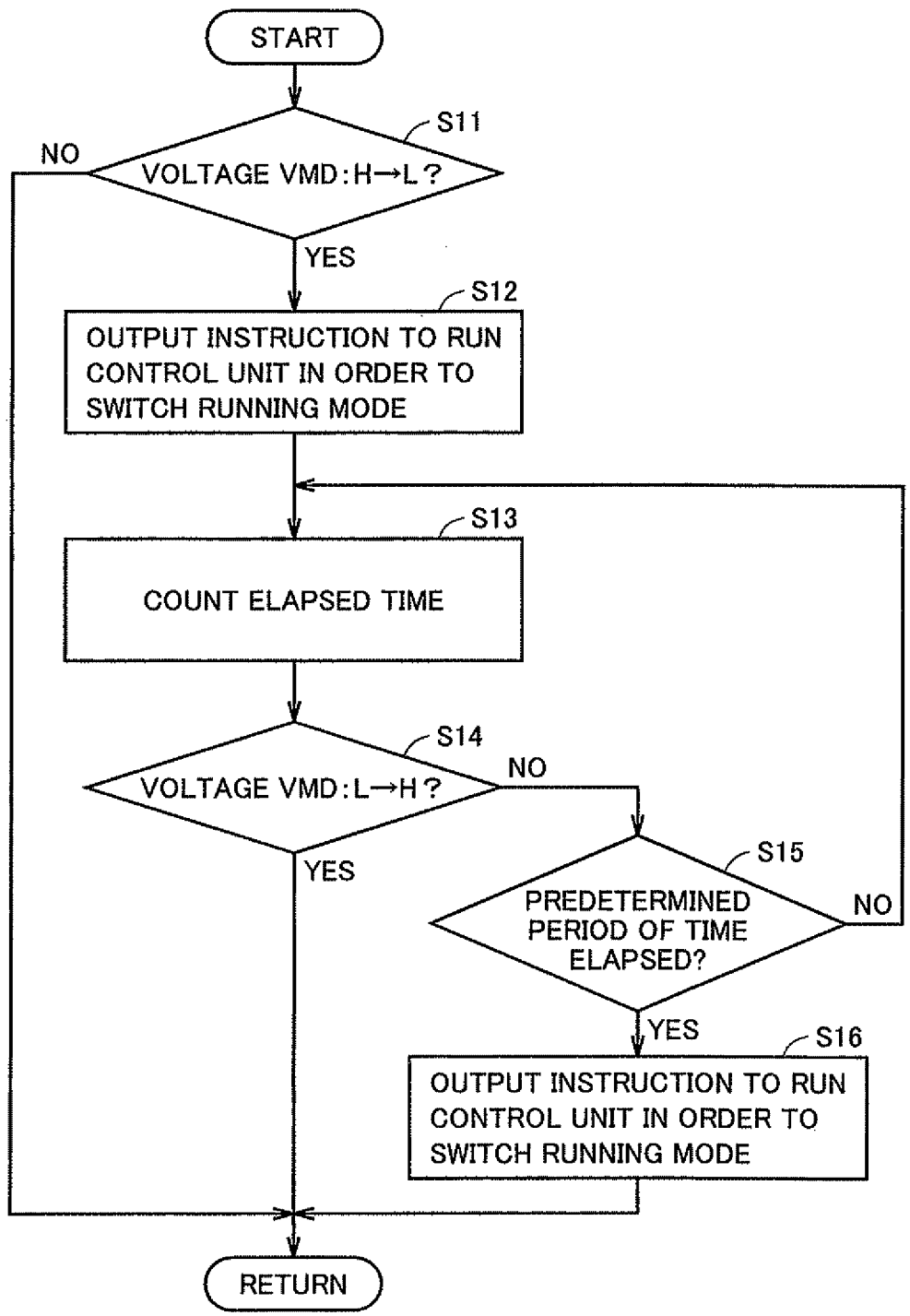
FIG. 16 is a flowchart for describing switching control of the mode according to the second embodiment.

FIG. 16 is a flowchart to describe switching control of the running mode according to the second embodiment. The process shown in this flowchart is invoked from the main routine at every predetermined cycle, and executed by mode switch control unit 290 (refer to FIG. 8).

Referring to FIG. 16, mode switch control unit 290 determines whether voltage VMD has changed from the H level to the L level (step S11). At step S11, a process similar to that of step S1 is executed.

When a determination is made that voltage VMD has not changed from the H level to the L level (NO at step S11), the overall process is returned to the main routine. When a determination is made that voltage VMD has changed from the H level to the L level (YES at step S11), mode switch control unit 290 outputs an instruction to run control unit 250 to switch the running mode (step S12). Run control unit 250 switches the running mode according to an instruction from mode switch control unit 290.

Mode switch control unit 290 measures the elapsed time from the point in time when voltage VMD changes from the H level to the L level (step S13).

Then, mode switch control unit 290 determines whether voltage VMD has changed from the L level to the H level (step S14). The process of step S14 is similar to that of step S2.

When a determination is made that voltage VMD has not changed from the L level to the H level (NO at step S14), the process of step S15 is executed. At step S15, mode switch control unit 290 determines whether a predetermined period of time has elapsed from the point in time when voltage VMD has changed from the H level to the L level. When a determination is made that the predetermined period of time has not elapsed (NO at step S15), the process returns to step S13. In contrast, when a determination is made that the predetermined period of time has elapsed (YES at step S15), the process of step S16 is executed. At step S16, mode switch control unit 290 outputs to run control unit 250 an instruction to switch the running mode. Run control unit 250 switches the running mode between the CD mode and CS mode according to the instruction from mode switch control unit 290.

At step S14, the overall process is returned to the main routine in the case where voltage VMD is changed from the L level to the H level (YES at step S14). The overall processing is returned to the main routine also when the processing of step S16 ends.

It is considered that the possibility of the driver continuously operating switch 82 longer than the general operation time is low. Therefore, in the case where control line 81 is proper and switch 82 has been operated properly, the possibility of voltage VMD changing from the H level to the L level, and then returning to the H level from the L level before the elapse of a predetermined period of time from the point in time when the aforementioned change occurs is high. In this case, mode switch control unit 290 settles the running mode at the mode attained after switching.

In the case where control line 81 is short-circuited to the earth, voltage VMD changes from the H level to the L level. However, voltage VMD remains at the L level even after the elapse of the predetermined period of time from the point in time when the change has occurred. In this case, mode switch control unit 290 outputs an instruction to return the running mode to the mode set prior to switching. In other words, the running mode of the hybrid vehicle returns to the former mode, although once switched. Therefore, the event of the vehicle running continuously in a running mode differing from the proper running mode when there is an error at control line 81 (in the case where control line 81 is connected to the earth) can be avoided according to the second embodiment.

Third Embodiment

A configuration of a hybrid vehicle according to the third embodiment is similar to that of the hybrid vehicle of the first embodiment. The third embodiment differs from the first embodiment and second embodiments in the issue of switching control of the running mode.

Figure 17:
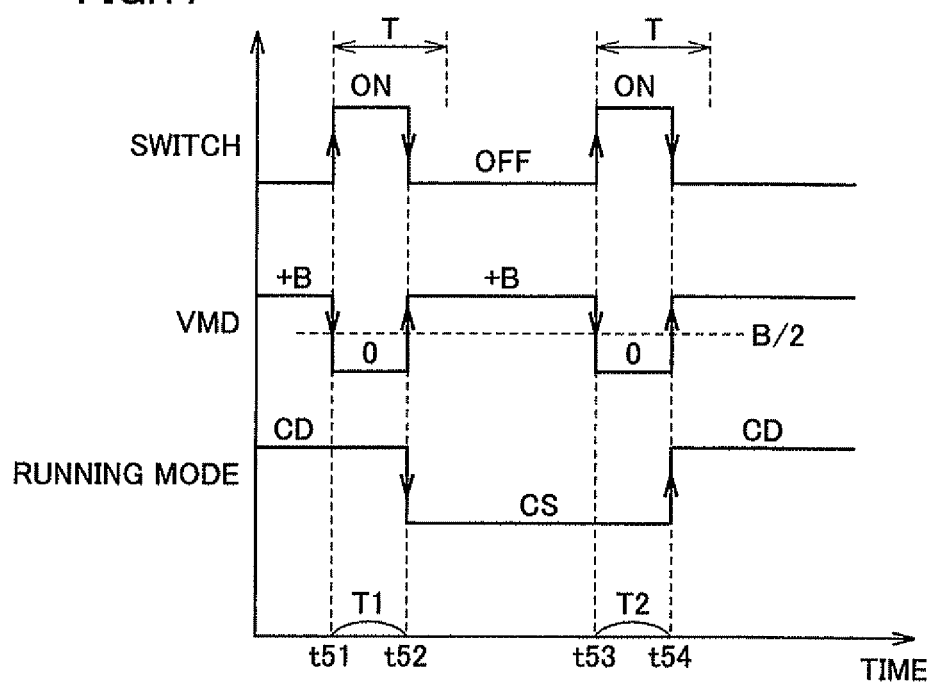
FIG. 17 is a timing chart for describing switching control of the running mode according to a third embodiment.

FIG. 17 is a timing chart to describe switching control of the running mode according to the third embodiment.

Referring to FIGS. 17 and 14, time t51, t52, t53 and t54 correspond to time t31, t32, t33 and t34, respectively. A period of time T1 from time t51 to time t52 and a period of time T2 from time t53 to time t54 is shorter than a predetermined period of time T. Likewise with the second embodiment, the length of the predetermined period of time T is set at the length of approximately the general operating time of switch 82 (although not particularly limited, several seconds, for example).

In the third embodiment, the running mode is switched in the case where voltage VMD changes from the L level to the H level before the elapse of a predetermined period of time T from the point in time when voltage VMD changes from the H level to the L level. Specifically, at time t52, the running mode is switched from the CD mode to the CS mode, and then at time t54, the running mode is switched from the CS mode to the CD mode.

As shown in FIG. 15, voltage VMD changes from +B to 0 when control line 81 is short-circuited to the earth. However, voltage VMD remains at 0 even after the elapse of predetermined period of time T from the point in time when voltage VMD changes (time t41). In the third embodiment, the running mode is not switched in such a case, Accordingly, the event of the vehicle continuing to run in a mode differing from the proper running mode when an error occurs at control line 81 (when control line 81 is short-circuited to the earth) can be avoided in the third embodiment.

Figure 18:
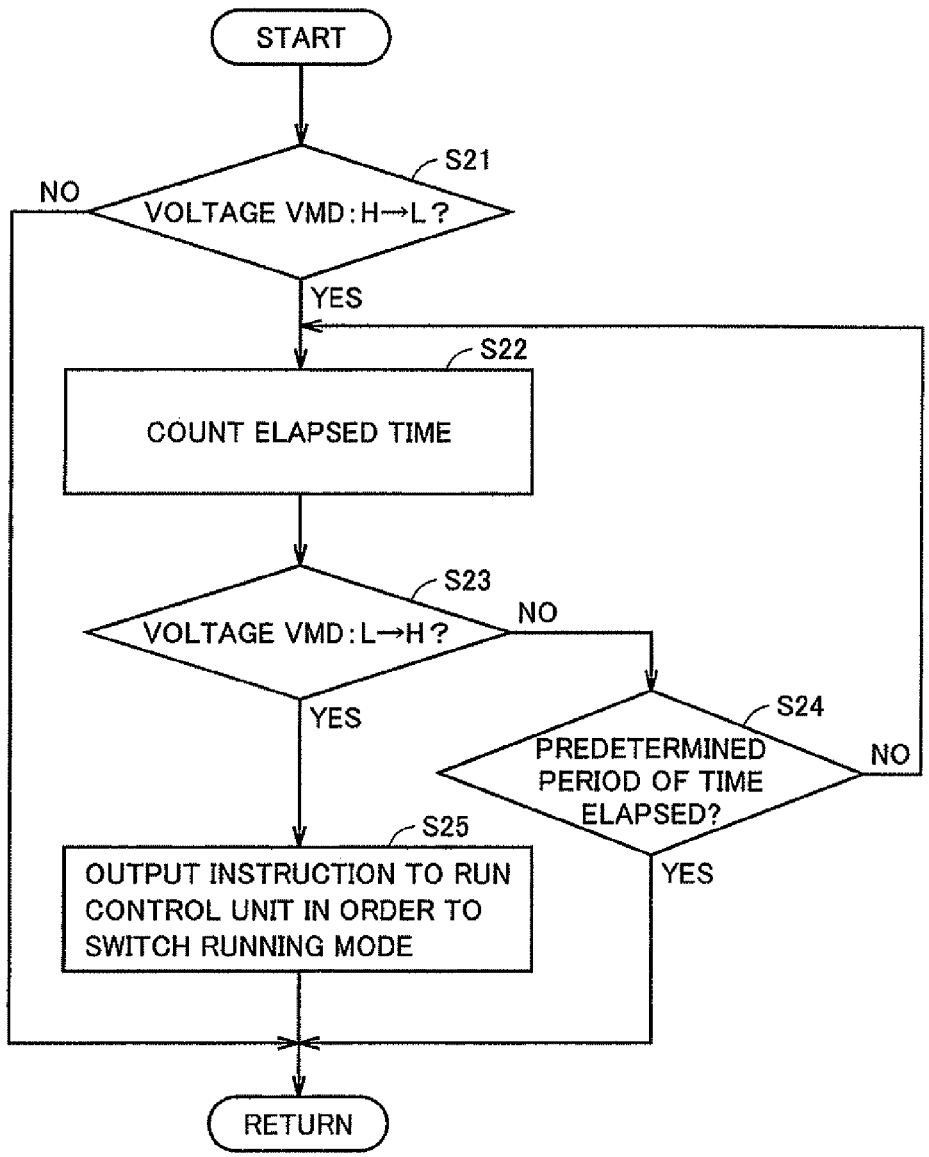
FIG. 18 is a flowchart for describing switching control of the running mode according to the third embodiment.

FIG. 18 is a flowchart to describe switching control of the running mode according to the third embodiment. The process shown in the flowchart is invoked from the main routine at every predetermined cycle to be executed by mode switch control unit 290 (refer to FIG. 8).

Referring to FIG. 18, mode switch control unit 290 determines whether voltage VMD has changed from the H level to the L level (step S21). At step S21, a process similar to that of step S1 is executed.

When a determination is made that voltage VMD has not changed from the H level to the L level (NO at step S21), the overall process is returned to the main routine. When a determination is made that voltage VMD has changed from the H level to the L level (YES at step S21), mode switch control unit 290 counts the elapsed time from the point in time when voltage VMD has changed from the H level to the L level (step S22).

Then, mode switch control unit 290 determines whether voltage VMD has changed from the L level to the H level (step S23). When a determination is made that voltage VMD has not changed from the L level to the H level (NO at step S23), mode switch control unit 290 executes the process of step S24. At step S24, mode switch control unit 290 determines whether a predetermined period of time has elapsed from the point in time when voltage VMD has changed from the H level to the L level. When a determination is made that the predetermined period of time has not elapsed (NO at step S24), the process returns to step S22. When a determination is made that the predetermined period of time has elapsed (YES at step S24), the overall process ends.

When a determination is made that voltage VMD has changed from the L level to the H level (YES at step S23), mode switch control unit 290 outputs an instruction to run control unit 250 to switch the running mode (step S25). Run control unit 250 switches the running mode according to the instruction from mode switch control unit 290. When the process of step S25 ends, the overall process is returned to the main routine.

In the case where control line 81 is proper and switch 82 has been operated properly, the possibility of voltage VMD changing from the H level to the L level, and then returning to the H level from the L level before the elapse of a predetermined period of time T from the point in time when the aforementioned change occurs is high. In this case, mode switch control unit 290 settles the running mode at the mode attained after switching.

In the case where control line 81 is short-circuited to the earth, voltage VMD changes from the H level to the L level. However, voltage VMD remains at the L level even after the elapse of a predetermined period of time from the point in time when the change has occurred. In this case, mode switch control unit 290 does not output an instruction to switch the running mode. In other words, the running mode of the hybrid vehicle is not switched. Therefore, the event of the vehicle continuing to run in a mode differing from the proper running mode when an error occurred at control line 81 (when control line 81 is short-circuited to the earth) can be avoided in the third embodiment.

Figure 19:
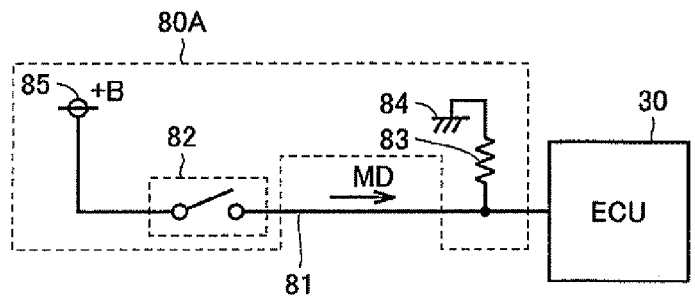
FIG. 19 represents another configuration of a signal generation circuit.

The configuration of the signal generation circuit incorporated in the hybrid vehicle of the present embodiment is not limited to that shown in FIG. 5. FIG. 19 represents another configuration of a signal generation circuit.

Referring to FIG. 19, a signal generation circuit 80A differs from signal generation circuit 80 in that a switch 82 is provided between control line 81 and ground node 84, and that a resistor 83 is connected between control line 81 and ground node 84. When switch 82 is ON in accordance with this configuration, the voltage at control line 81 changes from 0 to +B. In the case where control line 81 is short-circuited to power supply node 85, the voltage at control line 81 remains at +B.

The switching control of the running mode in any of the first to third embodiments can be applied even when signal generation circuit 80 is replaced with signal generation circuit 80A. It is to be noted that, in this case, mode switch control unit 290 determines whether voltage VMD has changed from the L level to the H level or not at steps S1, S11 and S21. At steps S2, S14 and S23, mode switch control unit 290 determines whether voltage VMD has changed from the H level to the L level.

Although the present embodiment has been described based on an internal combustion engine (engine) as the second power source incorporated in a hybrid vehicle, the present invention is also applicable to a hybrid vehicle including a plurality of power sources, differing in type from each other, and having a plurality of running modes differing in the used mode of the plurality of power sources. Therefore, any power source of a type different from that of the first power source may be employed for the second power source, and is not limited to an internal combustion engine. For example, a fuel cell may be incorporated in the hybrid vehicle as the second power source.

It should be understood that the embodiments disclosed herein are illustrative and non-restrictive in every respect. The scope of the present invention is defined by the terms of the claims, rather than the description set forth above, and is intended to include any modifications within the scope and meaning equivalent to the terms of the claims.

The invention claimed is:

1. A hybrid vehicle comprising:
a first power source and a second power source, each configured to allow driving of said hybrid vehicle,
a control line,
a first node having a first voltage,
a second node having a second voltage,
a switch setting a voltage level of said control line at a first level corresponding to said first voltage by electrically coupling said control line with said first node when manual operation is not executed, and setting said voltage level of said control line at a second level corresponding to said second voltage by electrically coupling said control line with said second node during a period of time over which said manual operation is executed, and
a control device switching a running mode of said hybrid vehicle between a first mode in which said first power source is used having higher priority for a running of said hybrid vehicle, and a second mode in which said second power source is used having higher priority for the running of said hybrid vehicle, based on a change from said first level to said second level that is a first change in said voltage level of said control line, and a change from said second level to said first level that is a second change in said voltage level of said control line,
said control device switching said running mode between said first mode and said second mode when both said first change and said second change are detected.

2. The hybrid vehicle according to claim 1, wherein said first power source includes:
a rotating electric machine configured to allow driving a drive wheel, and
a power storage device configured to be able to store electric power, and supply the stored electric power to said rotating electric machine; and
the hybrid vehicle further comprises a charger configured to be able to charge said power storage device using electric power applied from a source external to said hybrid vehicle.

3. The hybrid vehicle according to claim 2, wherein said control device sets said running mode at said first mode when running of said hybrid vehicle is started for a first time after charging of said power storage device by said charger ends.

4. The hybrid vehicle according to claim 1, wherein said first power source includes:
a rotating electric machine configured to allow driving a drive wheel, and
a power storage device configured to be able to store electric power, and supply the stored electric power to said rotating electric machine; and
said second power source includes:
an internal combustion engine.

5. The hybrid vehicle according to claim 4, wherein said first mode causes said rotating electric machine to be driven using electric power stored in said power storage device, and
said second mode causes said hybrid vehicle to run by driving said internal combustion engine.

6. A hybrid vehicle comprising:
a first power source and a second power source, each configured to allow driving of said hybrid vehicle,
a control line,
a first node having a first voltage,
a second node having a second voltage,
a switch setting a voltage level of said control line at a first level corresponding to said first voltage by electrically coupling said control line with said first node when manual operation is not executed, and setting said voltage level of said control line at a second level corresponding to said second voltage by electrically coupling said control line with said second node during a period of time over which said manual operation is executed, and
a control device switching a running mode of said hybrid vehicle between a first mode in which said first power source is used having higher priority for a running of said hybrid vehicle, and a second mode in which said second power source is used having higher priority for the running of said hybrid vehicle, based on a change from said first level to said second level that is a first change in said voltage level of said control line, and a change from said second level to said first level that is a second change in said voltage level of said control line,
said control device switching said running mode between said first mode and said second mode according to said first change,
and returning said running mode to the mode set prior to a base point in time when said second change does not occur before an elapse of a predetermined period of time from said base point in time when said first change has occurred, and holding said running mode at the mode attained after said base point in time when said second change occurs before the elapse of said predetermined period of time from said base point in time.

7. The hybrid vehicle according to claim 6, wherein said first power source includes:
a rotating electric machine configured to allow driving a drive wheel, and
a power storage device configured to be able to store electric power, and supply the stored electric power to said rotating electric machine; and
the hybrid vehicle further comprises a charger configured to be able to charge said power storage device using electric power applied from a source external to said hybrid vehicle.

8. The hybrid vehicle according to claim 6, wherein said first power source includes:
a rotating electric machine configured to allow driving a drive wheel, and
a power storage device configured to be able to store electric power, and supply the stored electric power to said rotating electric machine; and
said second power source includes:
an internal combustion engine.

9. A hybrid vehicle comprising:
a first power source and a second power source, each configured to allow driving of said hybrid vehicle,
a control line,
a first node having a first voltage,
a second node having a second voltage,
a switch setting a voltage level of said control line at a first level corresponding to said first voltage by electrically coupling said control line with said first node when manual operation is not executed, and setting said voltage level of said control line at a second level corresponding to said second voltage by electrically coupling said control line with said second node during a period of time over which said manual operation is executed, and a control device switching a running mode of said hybrid vehicle between a first mode in which said first power source is used having higher priority for a running of said hybrid vehicle, and a second mode in which said second power source is used having higher priority for the running of said hybrid vehicle, based on a change from said first level to said second level that is a first change in said voltage level of said control line, and a change from said second level to said first level that is a second change in said voltage level of said control line, said control device switching said running mode between said first mode and said second mode, when said second change occurs before an elapse of a predetermined period of time from a base point in time when said first change occurred, and holding said running mode at the mode set prior to said base point in time when said second change has not occurred before the elapse of said predetermined period of time from said base point in time.

10. The hybrid vehicle according to claim 9, wherein said first power source includes:

a rotating electric machine configured to allow driving a drive wheel, and a power storage device configured to be able to store electric power, and supply the stored electric power to said rotating electric machine; and the hybrid vehicle further comprises a charger configured to be able to charge said power storage device using electric power applied from a source external to said hybrid vehicle.

11. The hybrid vehicle according to claim 9, wherein said first power source includes:

a rotating electric machine configured to allow driving a drive wheel, and a power storage device configured to be able to store electric power, and supply the stored electric power to said rotating electric machine; and said second power source includes:

an internal combustion engine.

* * * * *